United States Patent
Weissman et al.

(10) Patent No.: US 11,789,900 B1
(45) Date of Patent: Oct. 17, 2023

(54) SNAPSHOT CAPACITY ESTIMATION

(71) Applicant: VAST DATA LTD., Tel Aviv (IL)

(72) Inventors: Asaf Weissman, Tel Aviv (IL); Vlad Zdornov, Tel Aviv (IL); Avi Goren, Tel Aviv (IL); Ohad Shamir, Tel Aviv (IL)

(73) Assignee: Vast Data Ltd., Tel Aviv (IL)

( * ) Notice: Subject to any disclaimer, the term of this patent is extended or adjusted under 35 U.S.C. 154(b) by 0 days.

(21) Appl. No.: 17/657,339

(22) Filed: Mar. 30, 2022

(51) Int. Cl.
*G06F 16/17* (2019.01)
*G06F 16/11* (2019.01)
*G06F 16/174* (2019.01)

(52) U.S. Cl.
CPC ........ *G06F 16/128* (2019.01); *G06F 16/1748* (2019.01)

(58) Field of Classification Search
CPC ............................ G06F 16/128; G06F 16/1748
See application file for complete search history.

(56) References Cited

U.S. PATENT DOCUMENTS

2020/0218454 A1\* 7/2020 Hallak .................... G06F 3/064

\* cited by examiner

*Primary Examiner* — Apu M Mofiz
*Assistant Examiner* — Cindy Nguyen
(74) *Attorney, Agent, or Firm* — Reches Patents

(57) ABSTRACT

A method for determining size information related one or more snapshots related to file systems stored in a storage system, the method may include (a) sampling one or more combinations of points in time and logical spaces, the logical spaces are associated with the one or more file systems to provide sampled combinations of sampled portions of file system entities (FSEs) and sampled points in time; (b) searching for relevant snapshots that are relevant to the sampled combinations to provide relevant snapshots at the sampled points in time; and (c) determining physical sizes of the relevant snapshots at the sampled point in time; wherein a number of samples per sampled FSE is indicative of a size of the sampled FSEs.

23 Claims, 10 Drawing Sheets

SNAPSHOT CAPACITY ESTIMATION

TECHNICAL FIELD

The present disclosure generally relates to the field of data storage, and more particularly to snapshot capacity estimation.

BACKGROUND

Snapshots reflect the content of a filesystem entity as it was at a certain point in time. Snapshots capture only space of data that was overwritten by later versions. Multiple versions of certain content can be referred to by multiple snapshots that share the same certain content. The filesystem entity that is protected by a snapshot may be a whole filesystem or a portion of a filesystem, such as a sub-hierarchy of the tree of the filesystem.

There is a need for a simple and improved technique for estimating the amount of space that can be reclaimed by deleting snapshots of different hierarchies of a filesystem and different times, without or before actually deleting the snapshots.

SUMMARY

There may be provided a storage system, a method and a non-transitory computer readable medium for snapshot capacity estimation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
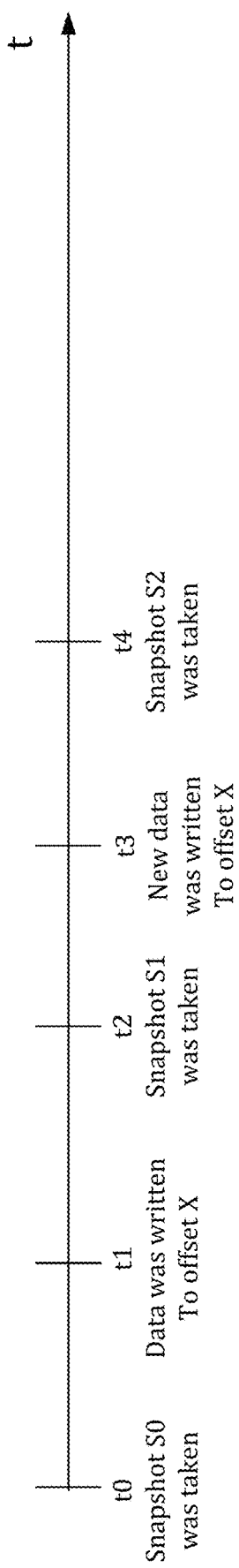
FIGS. 1-6 illustrate timing diagrams.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a non-transitory computer readable medium and a method that may provide estimation of snapshot sizes.

The storage system described herein is capable of providing responses to user's what-if queries regarding the expected amount of space that will be freed upon snapshot deletion. There are two types of queries: unique estimated physical capacity and group estimated physical capacity.

The storage system supports taking snapshots of any of the sub hierarchies (directories) within the tree that forms a filesystem.

Unique estimated physical capacity refers to the physical space that would be freed if a specific snapshot is deleted. The unique estimated physical capacity is the capacity occupied by data that is protected only by the specific snapshot and not shared with any other snapshot.

See for example the timeline diagram 11 of FIG. 1, where data that was written to a certain logical location (e.g., an offset within a file), such as offset X, at time t1, between snapshots s0 and s1 that were taken at t0 and t2, respectively. The data is protected only by snapshot s1 that was taken at t2. The data at offset X was overwritten at t3— which is a time that is protected by a following snapshot s2 taken at t4. The data written at t1 is unique to snapshot s1, as it is not shared with any other snapshot, therefore—its occupied space should be counted as "unique physical capacity", that in this case is being associated with snapshot s1, meaning that if s1 will be deleted, the capacity represented by the written content to offset X at time t1 will be deleted.

Group estimated physical capacity refers to the physical space that would be freed if the specific snapshot is deleted, along with deletion of all snapshots, that are older than this snapshot (and may share some of the same data).

Figure 2:
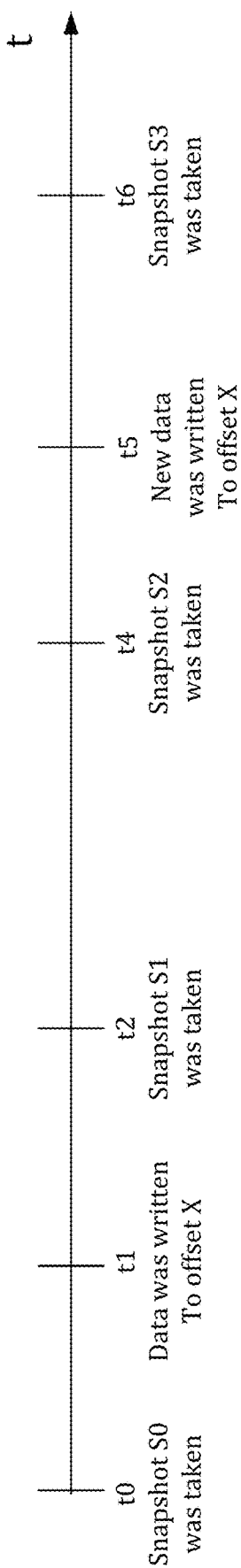

Referring to the timeline diagram 12 of FIG. 2, looking at snapshot s2 and the data at offset X—the data was written at time t1 that is associated with a snapshot s1 of t2, but is shared by both snapshots s1 and s2, since no overwrite occurred between the two snapshots. Therefore, deleting only snapshot s2 would not release the space occupied by this data, as it should be still protected by s1.

The data was written at t1 was overwritten at a timeline t5 that corresponds to a later snapshot s3 at t6, that does not immediately follow snapshot s1 (snapshot s2 is an intermediate snapshot between snapshots s1 and s3). Therefore, deleting snapshot s1 does not delete the data at offset X associated with s1, since it is shared with one or more snapshots that immediately follow snapshot s1. In other words, there is at least one intermediate snapshot (s2) between the snapshot that is associated with the data and the snapshot that is associated with a rewritten content of the data at t5.

The capacity consumed by the content that was written to offset X at time t1 of FIG. 2, can be reclaimed only if both snapshots s1 and s2 will be deleted.

According to embodiments of the invention, the potential reclamation of the content that was written to offset X at time t1 is attributed to the newest snapshot that shares the data, in this case snapshot s2, as a group estimated physical capacity, meaning—if a group of snapshots that includes snapshot s2 and any older snapshot, would be deleted, then this space can be reclaimed. The snapshot attributed with a certain group estimated physical capacity (e.g., s2) is the newest snapshot among the group of snapshots that shares content X that was written at time t1, or in other words—the newest snapshot that precedes the overwrite of the data (the time when the data written at t1 became stale).

In order to estimate the group physical capacity and unique physical capacity, a sampling of the logical address space of the storage system is conducted.

The sampling is done in a manner that may guarantee (or at least attempt) that the number of samples per sampled FSE is indicative of a size of the sampled FSEs. For example—random or uniform sampling may be applied, where a large number of samples are performed. The number of samples during each period of sampling may depend on the total size occupied by filesystems being sampled and the desired statistical error. For example, for a 1-Peta byte storage system and an error of less than 1 GB, several tens of millions of samples are performed.

The sampling may include selecting a random offset within the logical address space of the storage system and a time when the offset was written to. The selecting may include selecting a random mapping entry in a mapping data structure of the storage system, wherein the mapping data structure maps offsets of any filesystem entity, written at any time, into physical addresses. The selected mapping entry maps a logical address (e.g., an offset within a file) that was written at a certain time into a physical address where the content is stored. Once a mapping entry is selected, the filesystem entity (e.g., a file), that owns the offset mapped by the entry, can be determined. The time of the content written in this offset is obtained from the information written in the mapping entry.

Referring to FIGS. 1 and 2 (including timing diagrams 11 and 12 respectively), the axes t illustrates a timeline with events related to content writes and snapshots being taken. Any point in time along the timeline that is associated with written data can be used as the sampled time. The values of the sampled times, as well as the other events (snapshot taken, written content) may be districts values along the timeline, e.g., t1, t2, t3, etc., with fixed intervals between the discrete values. The intervals and the discrete values may be determined by a system clock that ticks at fixed intervals, of e.g., milliseconds, tens milliseconds, seconds, etc.

Given a sample that includes an offset and a time—it is determined when the data of the sample ceased to exist (voidance time), either due to an overwrite of the offset on a later time or due to deletion of the respective file. For example, in FIG. 1, the voidance time of the data written at t1 to offset X, is t3.

Each data written in the system is associated with a write time. Detecting a voidance time may include: (i) searching a mapping metadata related to the sampled offset and includes mapping for different contents that were written at different times. The searching includes searching the next time when content was written to the same offset, wherein the next time is the closest time to the sampled time, that succeeds the sampled time; (ii) checking whether the file associated with the sampled offset was deleted, and if so—when it was deleted.

Figure 3:
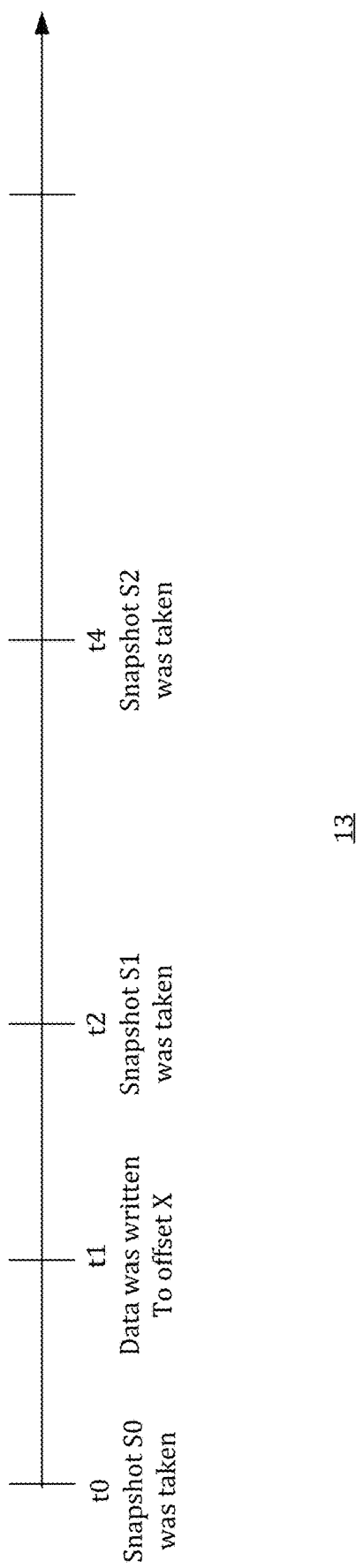

If a voidance time does not exist, then it means that the data of the sample is still relevant (used by the current working version), and it is not possible to delete it. Therefore, no size statistics need to be collected. Referring to FIG. 3 (illustrating timing diagram 13), with regard to the data at offset X written at t1— the data at offset X was not overwritten at later versions, therefore (and assuming the corresponding file was not deleted) there is no voidance time, and no size statistics need to be collected.

If a voidance time is obtained, it is determined which snapshots exist in the time frame between the sample time and the voidance time. The sample time is also a write time of the data in the sampled offset.

Figure 4:
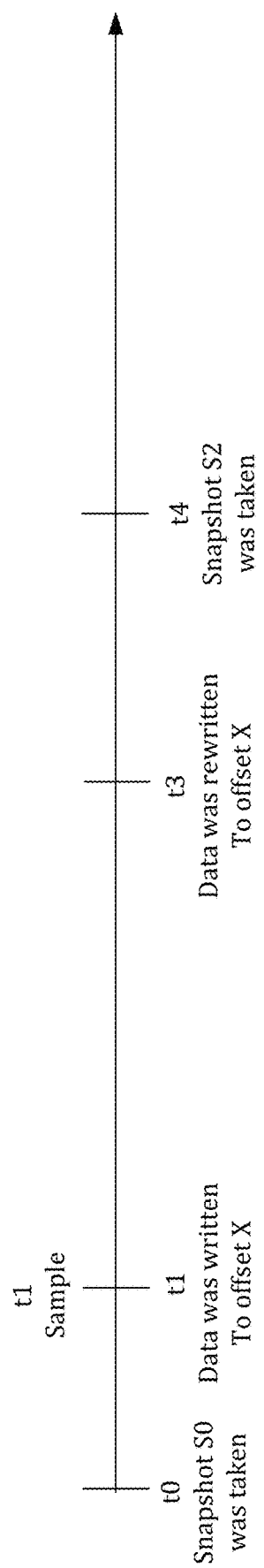

If no snapshot exists in this time frame—then no size statistics need to be collected. Referring to FIG. 4 (illustrating timing diagram 14), suppose the sample is taken for time t1 and offset X. The voidance time of the data written at t1 is t3, when offset X was rewritten. No snapshot was taken between the time t1 of the sample and the voidance time at t3. Therefore, there is no snapshot related to the sample that needs to be attributed with the potential reclaimed space, or in other words—there is no snapshot between t1 and t3 that protects the written content of offset X and time t1.

Figure 5:
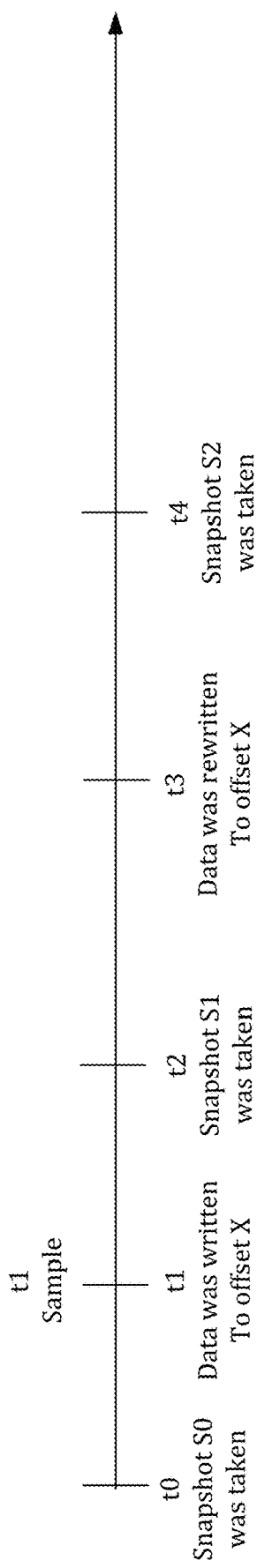

If only one snapshot exists in the time frame, the sample size is added to both the unique estimated physical capacity and the group estimated physical capacity of that sole snapshot. Referring to the sample taken for t1 of FIG. 5 (illustrating timing diagram 15), there is one snapshot s1 between the sampled time t1 when the data was written and the voidance time at t3. Therefore, snapshot s1 is credited for both unique estimated physical capacity and the group estimated physical capacity related to the size represented by the sampled offset X of t1.

Figure 6:
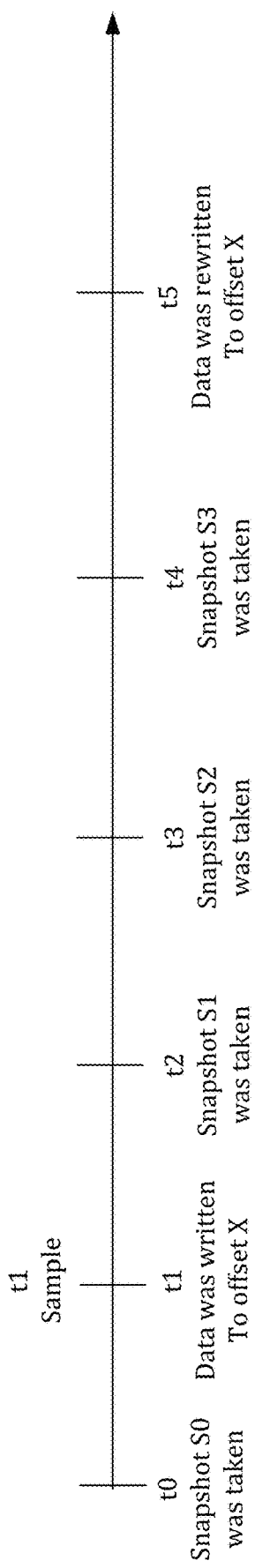

If multiple snapshots exist in the time frame—the size represented by the sample is added only to the group estimated physical capacity of the newest snapshot that precedes the voidance time. The unique physical space is not updated in this case. Referring to FIG. 6 (illustrating timing diagram 16), the sample of offset X at t1 is voided at t5. There are three snapshots s1-s3 at t2-t4 between the sample time and the voidance time. The newest snapshot among the three (that still precedes the voidance time) is snapshot s3. If snapshot s3 is deleted, and all the snapshots that are older than s3— are also deleted—then the content written at t1 to offset X is not covered by any snapshot and can be deleted. Therefore, the size of the space represented by offset X of time t1 is attributed to the group estimated physical capacity of snapshot s3, which is the newest snapshot needs to be deleted for reclaiming this space.

The contribution of the sample is added to counters that count the unique and group physical capacity of the corresponding snapshot. A snapshot is identified by the upper directory of a snapshotted sub-tree and a time identifier (or version identifier, or any other instance identifier).

Once the filesystem entity (e.g., a file) that includes the sampled offset is detected, the upper directory that is the subject of snapshotting is obtained, and then the counters of the snapshot associated with the upper directory and the sampled time can be accessed.

The physical size of a sample, that is mapped by the logical offset of the sample, is influenced by various data reduction mechanisms applied to the content.

The physical block related to the sample is determined by using a mapping data structure (FIGS. 8 and 9) that maps the offsets of each file and snapshot into physical locations. The logical offset is a key used for looking up the mapping data structure, so as to obtain a physical block where the content of the logical offset is stored.

The physical blocks within the storage devices may be of different sizes due to, at least, data reduction mechanism applied on data and resulting various compression ratios. The data reduction may include compression, deduplication and similarity mechanism.

The reduction rate of the physical block associated with the sample is determined. For example, if the original block size is 32 KB, and the compression mechanism reduced the block to 16 KB, then the reduction rate is 200% (uncompressed size divided by the compressed size). Meaning that a sampled logical byte is reduced in the physical plane into 0.5 byte (half of the sampled logical size). As for another example, if the physical block is deduplicated and shared by e.g., 5 other blocks, then the reduction rate is 500%, i.e., each of the five blocks sharing the content are attributed with only 20% of the original content. Meaning that the sampled byte is reduced in the physical plane into 0.2 byte.

The calculation is more complicated when similarity reduction is involved. The physical block associated with the sample may be similar to another block stored in the storage system. Storing a block that is identified as similar to another block (the other block is a reference block) may involve storing only a delta that is included only in the block and not included in the reference block, and a pointer to the reference block. The reference block is associated with a similar reference counter indicating the number of similar blocks referring to the reference block and sharing its content. In a case where the sampled byte is part of a block that points to a reference block, the estimated physical space occupied by this block is calculated as the sum of the block size plus the reference block size divided by the similar reference counter (the number of similar referring blocks).

The block of the sampled offset may be further pointed by multiple logical entities, e.g., files physical links. In this case the block size is divided into the number of referring logical entities. Therefore, the estimated physical space occupied by a block that refers to a similar reference block and is being referred by logical entities—is calculated as:

<sample block size>/<number of logical referring entities>+<similar reference block size>/<number of similar referring blocks>

The size of the physical sample is the size of 1 byte accounted to the logical sample divided by the data reduction ratio.

Figure 7:
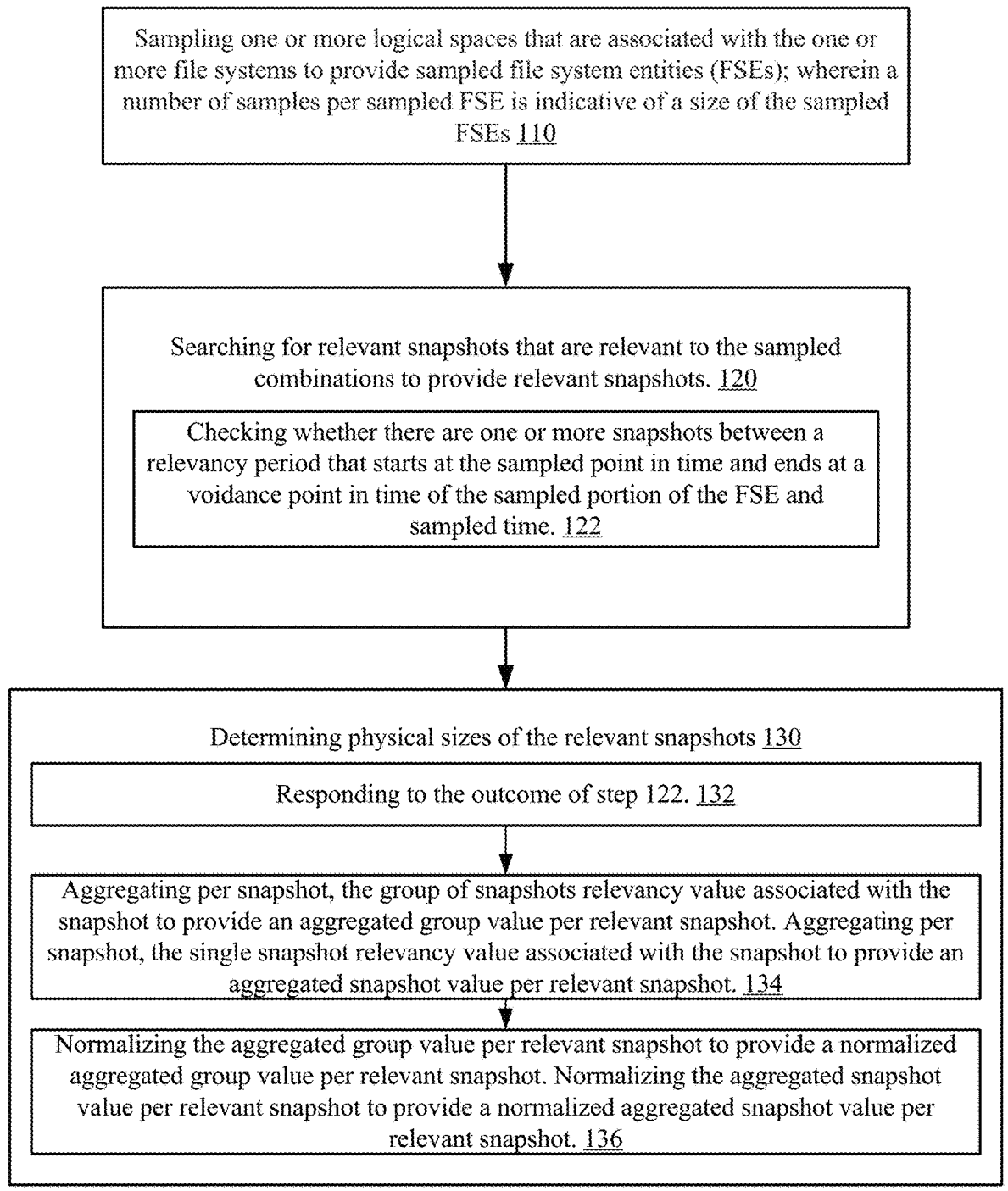
FIG. 7 is an example of a method.

FIG. 7 is an example of method 100 for determining size information related one or more snapshots related to file systems stored in a storage system.

Method 100 may start by step 110 of sampling one or more combinations of points in time and logical spaces, the logical spaces are associated with the one or more file systems to provide sampled combinations of sampled portions of file system entities (FSEs) and sampled points in time. The sampling may include selecting any offset (address range) within the logical spaces, regardless of any specific FSE or specific filesystem, and selecting a random time of data written to that offset. The sampling then includes obtaining an identity of the FSE that own the data in the selected offset. The FSE may be, for example, a file or a directory.

Step 110 may be followed by step 120 of searching for relevant snapshots that are relevant to the sampled combinations to provide relevant snapshots.

Step 120 may include step 122 of checking whether there are one or more snapshots between a relevancy period that starts at the sampled point in time and ends at a voidance point in time of the sampled portion of the FSE and sampled time.

Per sampled portion, step 122 may have one of the following outcomes:
  a. Finding that there is no relevant snapshot in the relevant period. See, for example— FIG. 4 in which there is no snapshot between sample time t1 and the voidance time—t3.
  b. Finding that there is a single relevant snapshot in the relevant period. See, for example— FIG. 5 in which snapshot S1 was taken between t1 and t3. In this case step 120 may include determining that the single snapshot is a single relevant snapshot associated with the sampled portion of the FSE.
  c. Finding that there are two or more snapshots (referred to as a group of snapshots) in the relevant period. See, for example— FIG. 6 in which snapshots S1, S2 and S3 were taken between t1 and t3. In this case, step 120 may include determining that the group of snapshots are a relevant group of snapshots associated with the sampled portion of the FSE.

Step 120 may be followed by step 130 of determining physical sizes of the relevant snapshots. A number of samples per sampled FSE is indicative of a size of the sampled FSEs.

Step 130 may include step 132 of responding to the outcome of step 122.

Step 132 may include:
  a. Increasing, by a value that is indicative of a size of the sampled portion of the FSE, a single snapshot relevancy value, when a single relevant snapshot is found in the relevant period.
  b. Increasing a group of snapshots relevancy value associated with the relevant group of snapshots. The group of snapshots relevancy value may be associated with a latest snapshot of the relevant group of snapshots, to indicate that a deletion of the latest snapshot along with deletion of older snapshots that may share the data of the FSE portion—will reclaim a storage capacity having the size of the sampled portion. The group of snapshots relevancy value may be increases by a size of the sample portion of the FSE. For example—referring to FIG. 6—a group of snapshots relevancy value related to snapshot S3 (the latest snapshot of the group) may be increased by a value that is indicative of the physical size of data at offset X. This data (at offset X) is shared by the group of snapshots—and if the group is deleted—the size of X can be reclaimed, as well as sizes of other samples of FSE portions related to the group.

Step 132 may be followed by step 134 of (i) aggregating per snapshot, the group of snapshots relevancy value associated with the snapshot to provide an aggregated group value per relevant snapshot, and (ii) aggregating per snapshot, the single snapshot relevancy value associated with the snapshot to provide an aggregated snapshot value per relevant snapshot. Steps 110-134 may be repeated multiple times (thousands, millions, tens of millions, etc.) so as to aggregate multitude samples of the snapshots before normalizing the aggregated values by step 136.

Step 134 may be followed by step 136 of (i) normalizing the aggregated group value per relevant snapshot to provide a normalized aggregated group value per relevant snapshot, and (ii) normalizing the aggregated snapshot value per relevant snapshot to provide a normalized aggregated snapshot value per relevant snapshot.

The normalized aggregated snapshot value per relevant snapshot is indicative of a storage system physical size that will be freed if the relevant snapshot is deleted.

The normalized aggregated snapshot value per relevant snapshot is indicative of a storage system physical size that will be freed if the relevant group of snapshots is deleted.

Step 136 of normalizing may take into account a data reduction parameter related to a storage of the relevant snapshot in the storage system.

The data reduction parameter may be a compression ratio or a de-duplication parameter or a similarity data reduction parameter. An example of a data reduction parameter—if the relevant FSE portion is referring to a reference stored element used for data reduction of a first number of referring stored elements, then the data reduction parameter represents the first number.

The sampling and the calculations of steps 110-134 are performed during sampling periods of either a certain time window, e.g., 10 minutes, or the period may be ended when a certain number of samples have been collected.

When a sampling period is terminated, a collection period is initiated for summing the capacity calculated by the samples, including step 136 of normalizing.

The sizes are normalized, so as to adjust to the real size of the physical space. It is assumed that the total physical size of the entire system is known. Therefore, the weight of the physical size of each sample is: the total physical size of the system divided by the number of samples that were taken during the sampling period. The weight of each sample is: the total physical size of the system divided by the number of samples that were taken during the sampling period. Therefore, if a certain counter (aggregated group value or unique value) counts Y bytes (when taking the data reduction into account), then the estimated physical size of the file is: Y*<total physical size>/<number of samples>.

Step 130 may be followed by step 140 of responding to the determining. The responding may include storing the normalized information (for example the normalized aggregated group value per relevant snapshot, and the normalized aggregated snapshot value per relevant snapshot), displaying the normalized information, sending to a client computer the normalized information, suggesting which snapshots should be deleted, receiving a query related to a snapshot and responding based on the normalized information, alerting a client, and the like.

Figure 8:
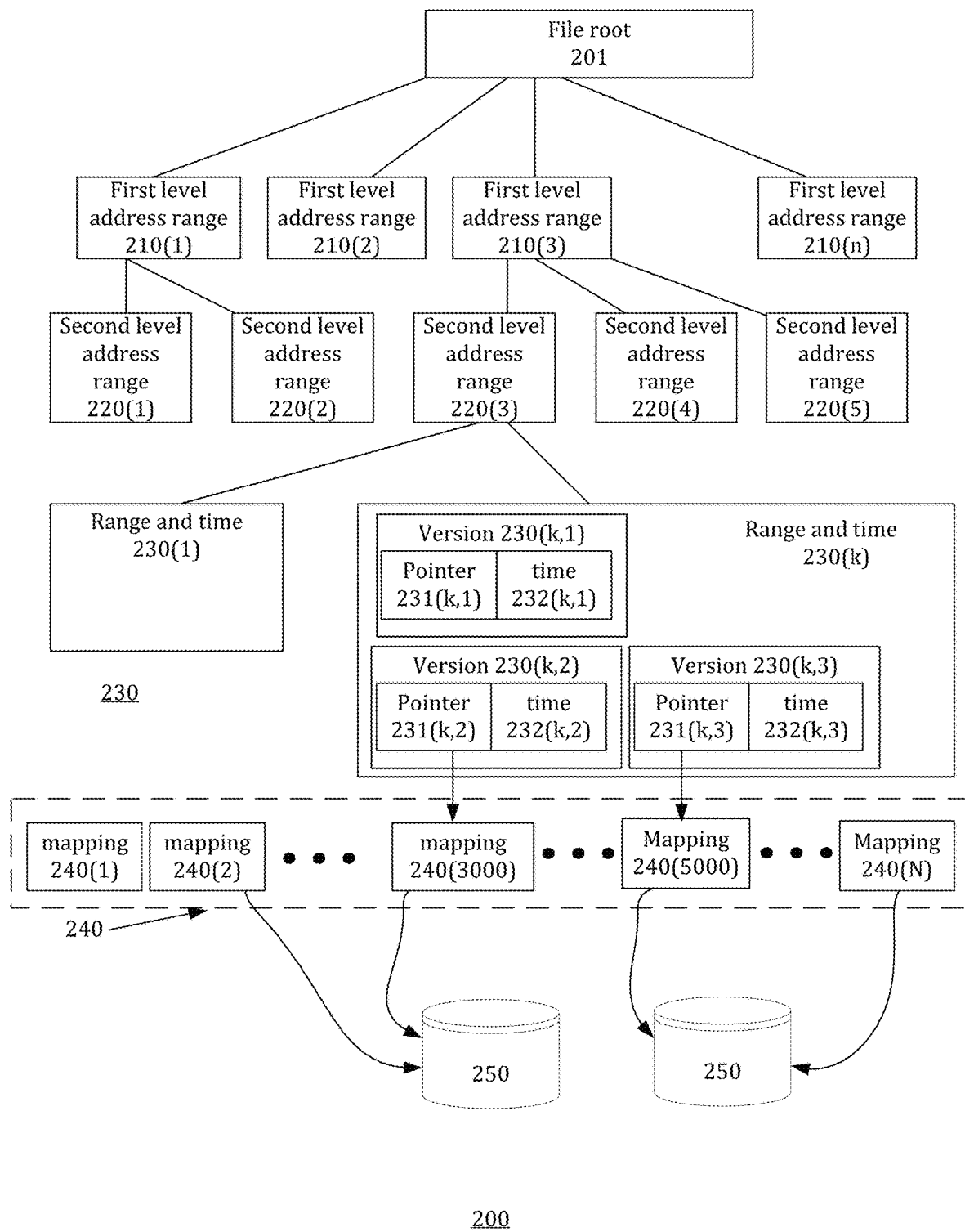
FIGS. 8 and 9 are examples of data structures.

FIG. 8 illustrates a mapping data structure 200 for mapping logical addresses of a filesystem entity such as a file, into physical locations where the data of the file is stored.

The file root 201 points to first level nodes 210(1)-210(n) that maps first level address ranges. Each first level node may point to one or more second level nodes that maps second level address ranges. For example—first level node 210(1) points to second level nodes 220(1) and 220(2), first level node 210(3) points to second level nodes 220(3), 220(4) and 220(5). There may be one or more levels of address ranges, wherein each level splits the ranges into smaller ranges.

The next level after the one or more levels of address ranges is a range and time mapping level 230 that includes K blocks of range and time mapping 230(1)-230(K). Each block includes multiple versions of the content in the range covered by the range and time mapping block. Range and time block 230(k) is illustrated as including three versions 230(k,1)-230(k,2) of data written to the logical address range (e.g., offset within the file) covered by 230(k). Each version is associated with a time when the data was written (e.g., time 232(k,1)-232(k,3)) and a pointer to the next level of mapping (e.g., pointer 231(k,1)-231(k,3)).

The next level is a mapping level 240 that includes mapping blocks that cover the entire logical address space of the system. Multiple files may share this level, since more than one file can share the same content. Each block of mapping level 240 maps a content of a certain logical range into a physical location 250.

Figure 9:
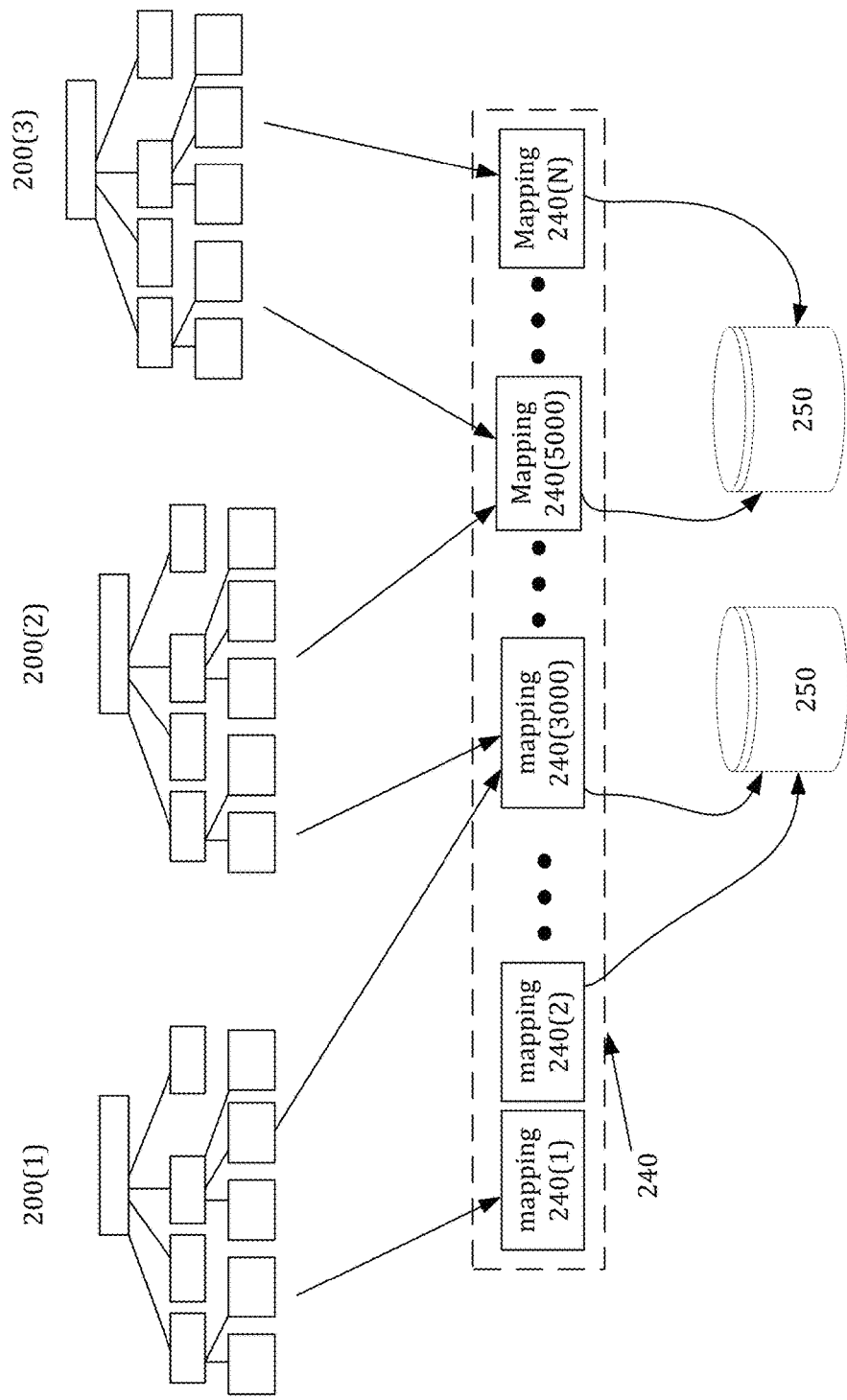

FIG. 9 illustrates an example of three mapping data structures 200(1)-200(3) of three different files that share mapping provided by mapping level 240.

Each block of mapping level 240 maps a content of a certain range written at a certain time.

When selecting a random sample of a logical offset, the selecting may include selecting any of the mapping blocks 240(1)-240(N). This selecting may further include selecting any offset out of the range covered by the selected mapping block. The identity of the file may be obtained from the selected mapping block.

When selecting a time for the sample, the selected offset can be used for looking up the mapping data structures 200 corresponding to the sampled file to find the range and time block 230 that corresponds to the selected offset, and randomly selecting any time of any version that is stored in the range and time block 230 to produce a sampled time.

Figure 10:
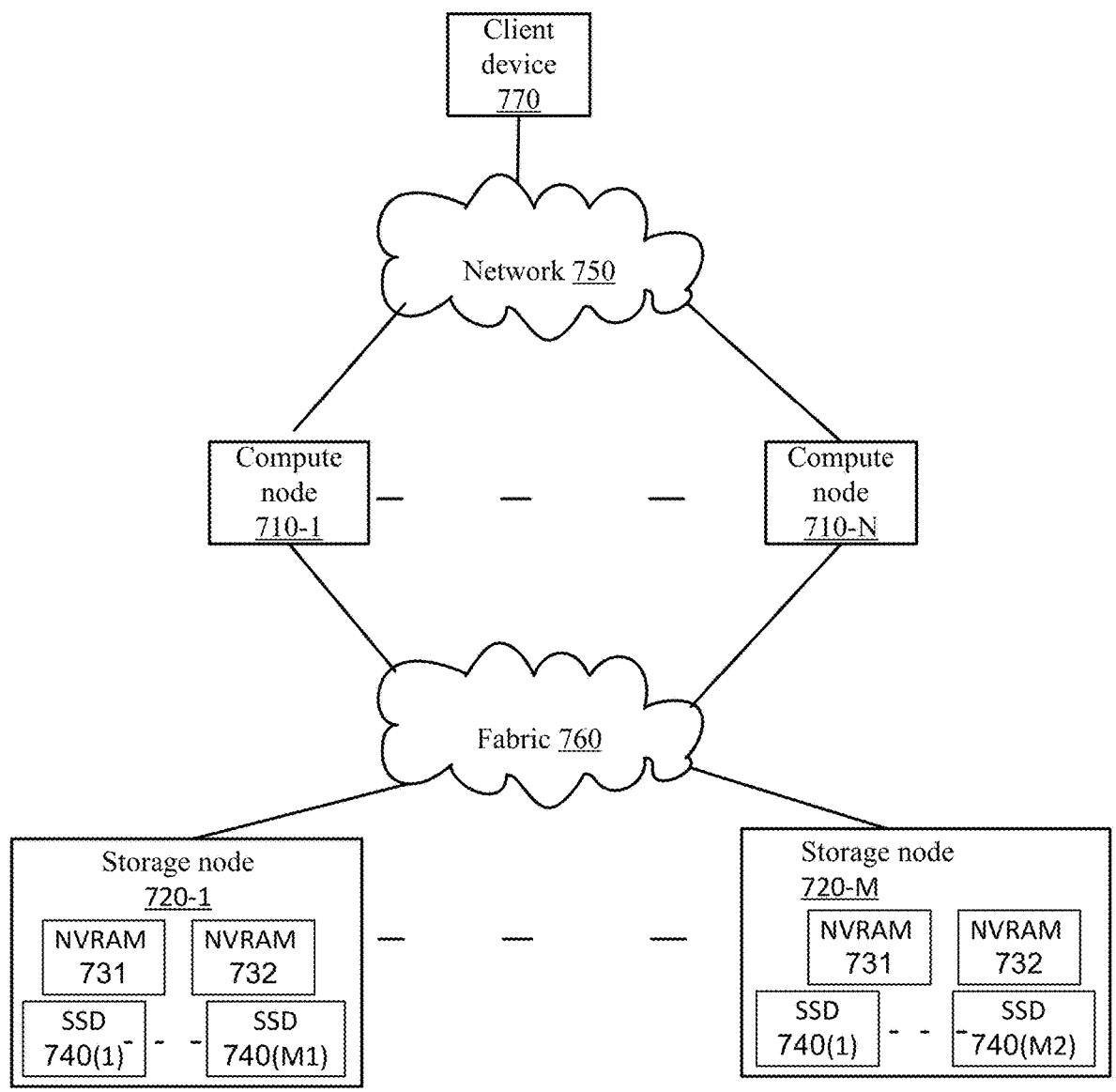
FIG. 10 is an example of a storage system.

FIG. 10 illustrates a storage system 700 that includes storage system compute elements such as multiple (N) compute nodes 710-1 to 710-N and storage resources such as multiple (M) storage nodes 720-1 to 720-M. The storage nodes may store the one or more file systems and at least one compute node mat be configured to execute method 100. The execution of method 100 may be accelerated when it is executed in parallel by multiple storage nodes—for example the sampling may be executed in parallel.

The compute nodes communicate with the storage nodes via a network, such as fabric 760, and with one or more clients, such as client device 770, via network 750, may receive snapshot size queries from client device 770 and send the queries responses to client device 770. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The filesystems, snapshots and the snapshot size counters are stored in various storage devices of the storage nodes. The storage system compute element may be a compute node or a compute entity (e.g., a processor) within the compute node.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for determining size information related one or more snapshots related to file systems stored in a storage system, the method comprises:
   (a) sampling one or more combinations of points in time and logical spaces, the logical spaces are associated with the one or more file systems to provide sampled combinations of sampled portions of file system entities (FSEs) and sampled points in time;
   (b) searching for relevant snapshots that are relevant to the sampled combinations to provide relevant snapshots;
   (c) determining physical sizes of the relevant snapshots; wherein a number of samples per sampled FSE is indicative of a size of the sampled FSEs; and
   (d) deleting selected snapshots from storage devices of the storage system, wherein the selected snapshots are selected from the relevant snapshots according to the physical sizes;
   wherein a searching of one or more relevant snapshots associated with a sampled portion of an FSE at a sampled point in time comprises:
      checking whether there are one or more snapshots within a relevancy period that starts at the sampled point in time and ends at a voidance point in time of the sampled portion of the FSE;

determining that there is no relevant snapshot associated with the sampled portion of the FSE at the sampled point in time when there is no snapshot within the relevancy period;

when finding only a single snapshot within the relevancy period then determining that the single snapshot is a single relevant snapshot associated with the sampled portion of the FSE at the sampled point in time;

when finding a group of snapshots within the relevancy period then determining that the group of snapshots are a relevant group of snapshots associated with the sampled portion of the FSE at the sampled point in time.

2. The method according to claim 1 comprising increasing, by a value that is indicative of a size of the sampled portion of the FSE at the sampled point in time, a single snapshot relevancy value.

3. The method according to claim 2 comprising increasing a group of snapshots relevancy value associated with the relevant group of snapshots.

4. The method according to claim 3 wherein the group of snapshots relevancy value is associated with a latest snapshot of the relevant group of snapshots.

5. The method according to claim 4 comprising displaying single snapshot relevancy values and group of snapshots relevancy values.

6. The method according to claim 3 wherein the group of snapshots relevancy value is increased by a size of the sampled portion of the FSE at the sampled point in time.

7. The method according to claim 1 wherein the determining of a physical size of a relevant snapshot at the sampled point in time is based on a data reduction parameter related to a storage of the relevant snapshot in the storage system.

8. The method according to claim 7 wherein the data reduction parameter is a compression ratio.

9. The method according to claim 7 wherein the data reduction parameter is a similarity data reduction parameter.

10. The method according to claim 9 wherein the relevant snapshot is referring to a reference stored element used for data reduction of a first number of referring stored elements, and wherein the data reduction parameter represents the first number.

11. The method according to claim 7 wherein the data reduction parameter is a de-duplication parameter.

12. A non-transitory computer readable medium for determining size information related one or more snapshots related to file systems stored in a storage system, the non-transitory computer readable medium stores instructions for:

sample one or more combinations of points in time and logical spaces, the logical spaces are associated with the one or more file systems to provide sampled combinations of sampled portions of file system entities (FSEs) and sampled points in time;

search for relevant snapshots that are relevant to the sampled combinations to provide relevant snapshots;

determine physical sizes of the relevant snapshots; wherein a number of samples per sampled FSE is indicative of a size of the sampled FSEs; and delete selected snapshots from storage devices of the storage system, wherein the selected snapshots are selected from the relevant snapshots according to the physical sizes;

wherein a searching of one or more relevant snapshots associated with a sampled portion of an FSE at a sampled point in time comprises:

check whether there are one or more snapshots within a relevancy period that starts at the sampled point in time and ends at a voidance point in time of the sampled portion of the FSE;

determine that there is no relevant snapshot associated with the sampled portion of the FSE at the sampled point in time when there is no snapshot within the relevancy period;

when finding only a single snapshot within the relevancy period then determine that the single snapshot is a single relevant snapshot associated with the sampled portion of the FSE at the sampled point in time;

when finding a group of snapshots within the relevancy period then determine that the group of snapshots are a relevant group of snapshots associated with the sampled portion of the FSE at the sampled point in time.

13. The non-transitory computer readable medium according to claim 12 that stores instructions for increasing, by a value that is indicative of a size of the sampled portion of the FSE at the sampled point in time, a single snapshot relevancy value.

14. The non-transitory computer readable medium according to claim 13 that stores instructions for increasing a group of snapshots relevancy value associated with the relevant group of snapshots.

15. The non-transitory computer readable medium according to claim 14 wherein the group of snapshots relevancy value is associated with a latest snapshot of the relevant group of snapshots.

16. The non-transitory computer readable medium according to claim 15 that stores instructions for displaying single snapshot relevancy values and group of snapshots relevancy values.

17. The non-transitory computer readable medium according to claim 15 wherein the group of snapshots relevancy value is increased by a size of the sampled portion of the FSE at the sampled point in time.

18. The non-transitory computer readable medium according to claim 12 wherein the determining of a physical size of a relevant snapshot is based on a data reduction parameter related to a storage of the relevant snapshot in the storage system.

19. The non-transitory computer readable medium according to claim 18 wherein the data reduction parameter is a compression ratio.

20. The non-transitory computer readable medium according to claim 18 wherein the data reduction parameter is a similarity data reduction parameter.

21. The non-transitory computer readable medium according to claim 20 wherein the relevant snapshot is referring to a reference stored element used for data reduction of a first number of referring stored elements, and wherein the data reduction parameter represents the first number.

22. The non-transitory computer readable medium according to claim 18 wherein the data reduction parameter is a de-duplication parameter.

23. A storage system that comprises storage resources and compute resources;

wherein one or more of the compute resources are configured to:

(a) sample one or more combinations of points in time and logical spaces, to provide sampled combinations of sampled portions of file system entities (FSEs) and sampled points in time; wherein the logical spaces are associated with one or more file systems stored in a storage system;
(b) search for relevant snapshots that are relevant to the sampled combinations to provide relevant snapshots; and
(c) determine physical sizes of the relevant snapshots; wherein a number of samples per sampled FSE is indicative of a size of the sampled FSEs; and
(d) delete selected snapshots from storage devices of the storage system, wherein the selected snapshots are selected from the relevant snapshots according to the physical sizes;

wherein a searching of one or more relevant snapshots associated with a sampled portion of an FSE at a sampled point in time comprises:
check whether there are one or more snapshots within a relevancy period that starts at the sampled point in time and ends at a voidance point in time of the sampled portion of the FSE;
determine that there is no relevant snapshot associated with the sampled portion of the FSE at the sampled point in time when there is no snapshot within the relevancy period;
when finding only a single snapshot within the relevancy period then determine that the single snapshot is a single relevant snapshot associated with the sampled portion of the FSE at the sampled point in time;
when finding a group of snapshots within the relevancy period then determine that the group of snapshots are a relevant group of snapshots associated with the sampled portion of the FSE at the sampled point in time.

* * * * *